(12) United States Patent
    Ruan

(10) Patent No.: US 10,998,743 B2
(45) Date of Patent: May 4, 2021

(54) MOBILE POWER BANK

(71) Applicant: Tianjin Synergy Groups Co., Ltd., Tianjin (CN)

(72) Inventor: Liangliang Ruan, Tianjin (CN)

(73) Assignee: Tianjin Synergy Groups Co., Ltd., Tianjin (CN)

( * ) Notice: Subject to any disclaimer, the term of this patent is extended or adjusted under 35 U.S.C. 154(b) by 218 days.

(21) Appl. No.: 16/345,830

(22) PCT Filed: Aug. 29, 2017

(86) PCT No.: PCT/CN2017/099456
    § 371 (c)(1),
    (2) Date: Apr. 29, 2019

(87) PCT Pub. No.: WO2018/082383
    PCT Pub. Date: May 11, 2018

(65) Prior Publication Data
    US 2019/0252894 A1    Aug. 15, 2019

(30) Foreign Application Priority Data
    Nov. 7, 2016  (CN) .......................... 201610977060.8

(51) Int. Cl.
    *H01M 10/46*    (2006.01)
    *H02J 7/00*     (2006.01)
    *H02J 7/34*     (2006.01)

(52) U.S. Cl.
    CPC ............ *H02J 7/0044* (2013.01); *H02J 7/342* (2020.01); *H02J 7/00* (2013.01)

(58) Field of Classification Search
    CPC ............ H01M 50/102; H01M 50/103; H01M 50/138; H01M 50/148; H01M 50/15;
    (Continued)

(56) References Cited

U.S. PATENT DOCUMENTS

| 2002/0195995 | A1* | 12/2002 | Cook | H01M 10/482 |
| | | | | 320/117 |
| 2013/0059185 | A1* | 3/2013 | Whitacre | H01M 12/005 |
| | | | | 429/99 |
| 2018/0287127 | A1* | 10/2018 | Onnerud | H01M 50/581 |

FOREIGN PATENT DOCUMENTS

| CN | 201222572 Y | 4/2009 |
| CN | 203036988 U | 6/2013 |

(Continued)

OTHER PUBLICATIONS

English translation of CN 205123347 (Mar. 30, 2016) (Year: 2016).*

(Continued)

*Primary Examiner* — Edward Tso
(74) *Attorney, Agent, or Firm* — Bond Schoeneck & King, PLLC; George McGuire

(57) ABSTRACT

A mobile power bank includes at least two cuboid modules including a control module and a battery module. The battery module includes a first telescopic element disposed on a first side, a first hole corresponding to the first telescopic element, a second telescopic element disposed on a sixth side, and second holes. The control module includes a first telescopic element disposed on a first side, a first hole corresponding to the first telescopic element and disposed on a second side, a power function element disposed on a sixth side, and second holes. The first telescopic element is electrically connected to the first hole in a pluggable manner. The second telescopic element is electrically connected to the second hole in a pluggable manner. The control module manages charging and discharging of the battery module accessed to the control module.

11 Claims, 9 Drawing Sheets

(58) Field of Classification Search
CPC ............ H01M 50/176; H01M 50/184; H01M 50/553; H01M 50/204; H02J 7/342; H02J 7/0044; H02J 7/0042; H02J 7/0027; H02J 7/025; H02J 7/70045
USPC .................. 320/107, 110, 112, 114, 116, 120
See application file for complete search history.

(56) References Cited

FOREIGN PATENT DOCUMENTS

| | | |
|---|---|---|
| CN | 203387211 U | 1/2014 |
| CN | 104882933 A | 9/2015 |
| CN | 204928239 U | 12/2015 |
| CN | 105356901 A | 2/2016 |
| CN | 205123347 U | 3/2016 |
| CN | 106329671 A | 1/2017 |
| CN | 206135491 U | 4/2017 |

OTHER PUBLICATIONS

English translation of CN 204928239 (Dec. 30, 2015) (Year: 2015).*
International Search Report and Written Opinion Form PCT/ISA/220 and PCT/ISA/237, International Application No. PCT/CN20171099456, p. 1-6, International Filing Date Aug. 29, 2017, dated Nov. 1, 2017.
Translated Chinese Office Action for Chinese Application 2016pp. 1-11. Date not available.

* cited by examiner

MOBILE POWER BANK

CROSS REFERENCE TO RELATED APPLICATIONS

This is a U.S. National Stage Application, filed under 35 U.S.C. 371, of International Patent Application No. PCT/CN2017/099456, filed on Aug. 29, 2017, which claims priority to Chinese patent application No. 201610977060.8 filed on Nov. 7, 2016, contents of both of which are incorporated herein by reference in their entireties.

TECHNICAL FIELD

The present disclosure relates to the field of battery technology, and in particular to a mobile power bank.

BACKGROUND

Mobile power bank is a portable charger that combines power supply and charging, and can charge the electronic devices used in everyday life anytime and anywhere. With the development of science and technology, the number of electronic devices is continuously increasing, and the amount of electricity required is increasing. The capacity and the endurance capability of mobile power bank become the most concerned issues for consumers.

In the related art, when mobile power banks are designed and manufactured, mobile power banks which are portable and have a small volume and a small capacity are generally provided for charging small electronic devices, and mobile power banks with large volume and large capacity are generally provided for charging large electronic devices. The mobile power bank has a targeted application scenario and lacks wide adaptation to different electronic devices. Electronic devices having multiple interfaces need to be equipped with different mobile power banks, which are inconvenient to use. For a single mobile power bank, after the charging and discharging performance falls below the usage index, it is necessary to buy a new mobile power bank, the battery cannot be replaced, which cause waste and pollute the environment.

SUMMARY

The present disclosure provides a mobile power bank, which solves the problem of poor adaptability and high replacement cost of the mobile power bank in the related art.

The present disclosure adopts the following technical solutions.

A mobile power bank includes at least two cuboid modules. The at least two cuboid modules have the same shape and include a control module and at least one battery module.

A first side and a second side of each of the at least two cuboid modules are oppositely disposed and shapes of the first side and the second side are square.

The battery module includes a first telescopic element disposed on the first side, a first hole disposed on the second side and corresponding to the first telescopic element, a third side, a fourth side, a fifth side and a sixth side, and a second telescopic element disposed on the sixth side. The third side, the fourth side and the fifth side are each provided with a second hole corresponding to the second telescopic element.

The control module includes a first telescopic element disposed on the first side, a first hole corresponding to the first telescopic element and disposed on the second side, a third side, a fourth side, a fifth side and a sixth side, and a power function element disposed on the sixth side. The third side, the fourth side and the fifth side are each provided with a second hole corresponding to the second telescopic element, the first telescopic element is configured to be electrically connected to the first hole in a pluggable manner, and the second telescopic element is configured to be electrically connected to the second hole in a pluggable manner.

The control module is configured to manage charging and discharging of the battery module connected to the control module.

In an alternative embodiment, at least one spherical hole is disposed on a side of the first telescopic element, and at least one spherical elastic locking element is disposed on an inner sidewall of the first hole.

When the first telescopic element is inserted into the first hole, the at least one spherical elastic locking element is embedded in the at least one spherical hole.

In an alternative embodiment, there are a plurality of spherical holes; and a spherical elastic locking element is disposed on an inner sidewall of an accommodating channel where the first telescopic element is located.

When the first telescopic element is located inside the cuboid module and when the first telescopic element is inserted into the first hole, the same spherical elastic locking element in the accommodating channel is embedded in different spherical holes of the first telescopic element.

In an alternative embodiment, the spherical elastic locking element is elastic colloid.

In an alternative embodiment, the spherical elastic locking element is further disposed in a first channel perpendicular to the sidewall of the accommodating channel or the first hole, and is connected to a first spring inside the first channel.

In an alternative embodiment, an elastic wedge structure is disposed on a side of a first end of the second telescopic element, and a length of a first side of an opening of the second hole is smaller than a length of a first side of an end surface that is inside the second hole and opposite to the opening.

When the second telescopic element is inserted into the second hole, the wedge structure is pushed into the second hole.

In an alternative embodiment, a first driving element configured to push the first telescopic element is connected to the first telescopic element, and an operating surface of the first driving element is disposed on the side.

A second driving element configured to push the second telescopic element is connected to the second telescopic element, and an operating surface of the second driving element is disposed on the first side or the second side.

In an alternative embodiment, at least one of the operating surface of the first driving element and the operating surface of the second driving element is provided with a resistance increased pattern.

In an alternative embodiment, a filling element is disposed in the first hole, a side of the filling element is provided with a spherical hole corresponding to the spherical elastic locking element.

An inner end of the filling element is connected to a first end of a second spring, and a second end of the second spring is fixed on a housing of the cuboid module.

When the first telescopic element is pulled out from the first hole, the spherical elastic locking element is embedded in the spherical hole of the filling element, and an outer end of the filling element is flush with the first side or the second side of the cuboid module.

In an alternative embodiment, the power function element comprises a display screen, a charging port and a discharge port; and a battery pack is disposed in the control module.

In an alternative embodiment, the battery module includes a charging port.

In the present disclosure, the mobile power bank is designed to be an assembly of a plurality of cuboid modules. The plurality of cuboid modules include at least one control module and at least one battery module. Two opposite surfaces of the cuboid module each have a square shape. Two base surfaces of the cuboid module are respectively provided with a first telescopic element and a first hole which can be connected with each other in a fitting manner. One of the four side s of the battery module is provided with a second telescopic element, and the other three are provided with a second hole. One of the four side surfaces of the control module is provided with a power function element, and the other three side surfaces are each provided with a second hole. The second telescopic element and the second hole can be connect with each other in a fitting manner. The mobile power bank can realize the free combination of any number of battery modules through the connection of the first telescopic element and the first hole and the connection of the second telescopic element and the second hole, and the control module performs charge and discharge management on the combined mobile power bank. The on-demand setting of the mobile power bank volume is realized, and the separate replacement of the battery module reduces the mobile power replacement cost while being more environmentally friendly.

10—control module; 11—first telescopic element; 111—first driver element; 112—spherical elastic locking element; 113—first spherical hole; 12—first hole; 121—filling element; 122—second spherical hole; 123—second spring; 13—second telescopic element; 131—wedge structure; 132—second driver element; 14—second hole; 15—power function element; 20—battery module.

DETAILED DESCRIPTION

In order to explain the technical means and functions adopted by the present disclosure for achieving a predetermined disclosure purpose, the detailed description, structures, features, and functions of the mobile power bank according to the present disclosure will be described below in detail with reference to the drawings and embodiments.

Figure 1:
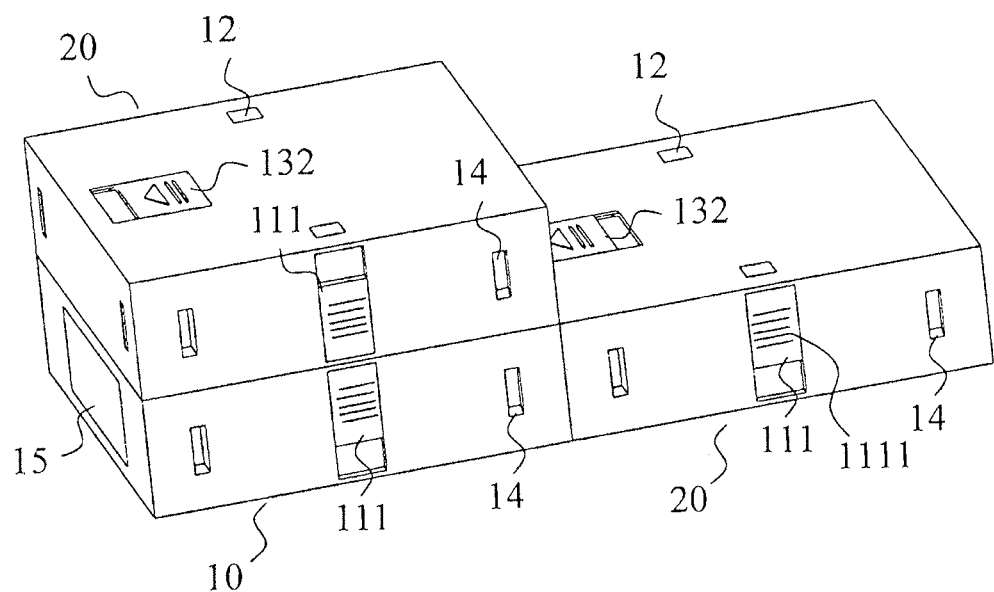
FIG. 1 is an assembly diagram of a mobile power bank according to an embodiment.
Figure 2:
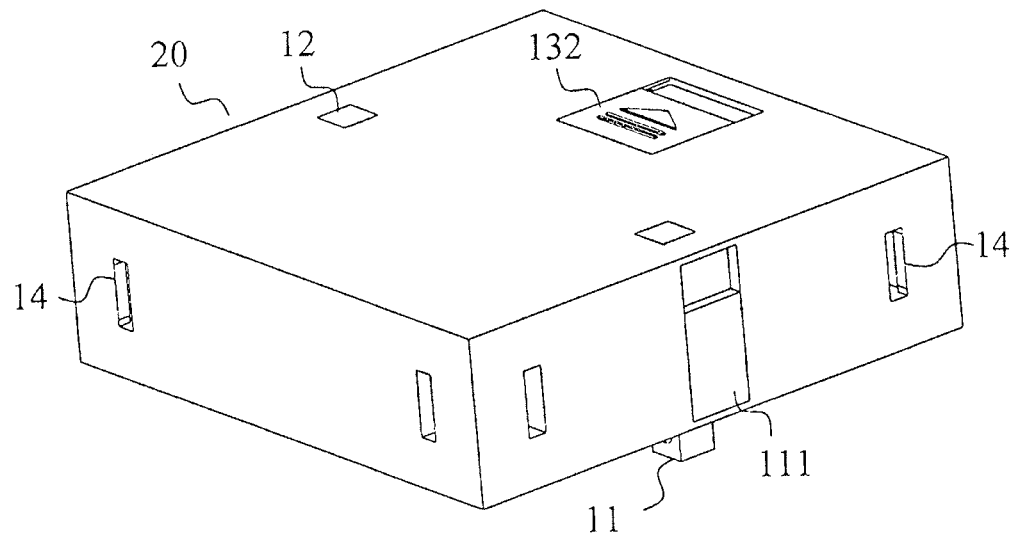
FIG. 2 is an overall structure diagram of a battery module of a mobile power bank according to an embodiment.
Figure 3:
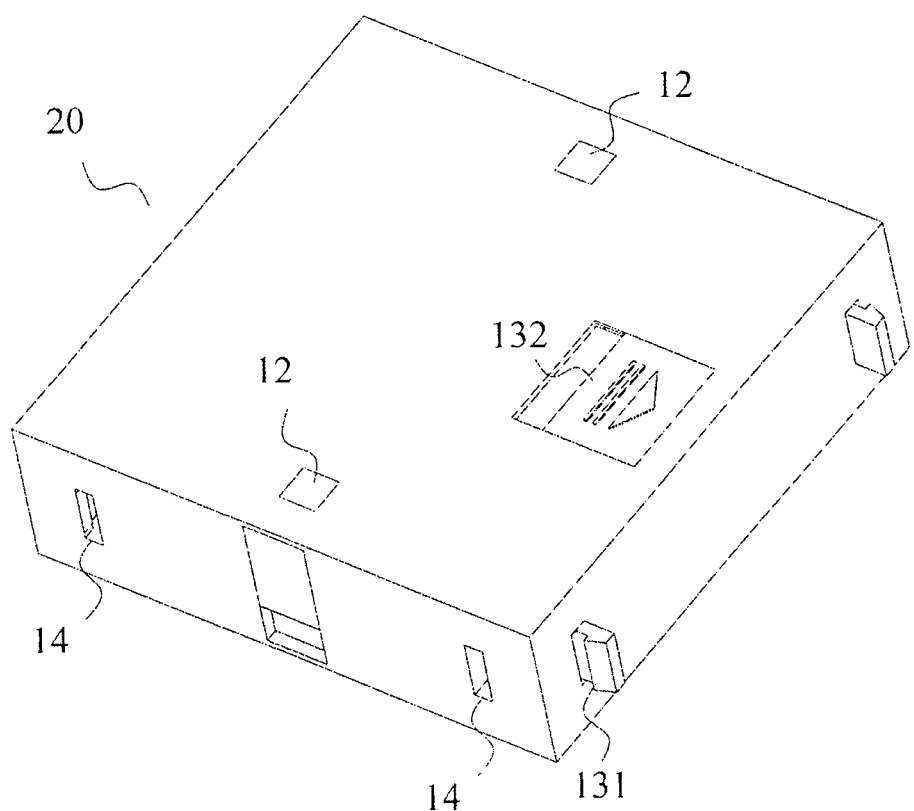
FIG. 3 is an overall structural diagram of a battery module of a mobile power bank viewed from another angle according to an embodiment.
Figure 4:
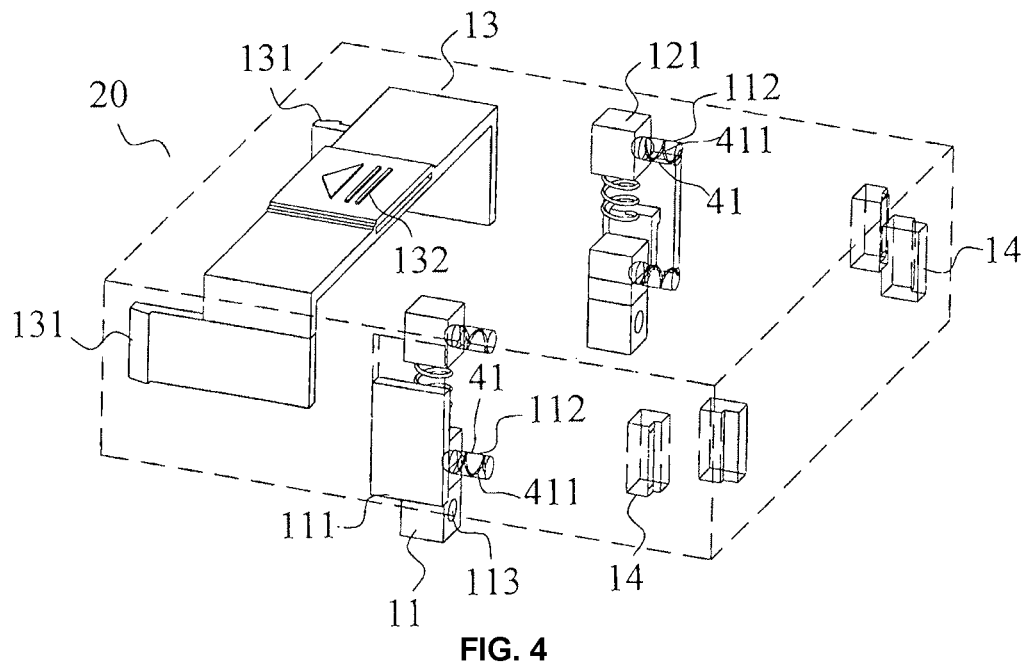
FIG. 4 is a diagram showing an internal structure of a battery module of a mobile power bank according to an embodiment.
Figure 5:
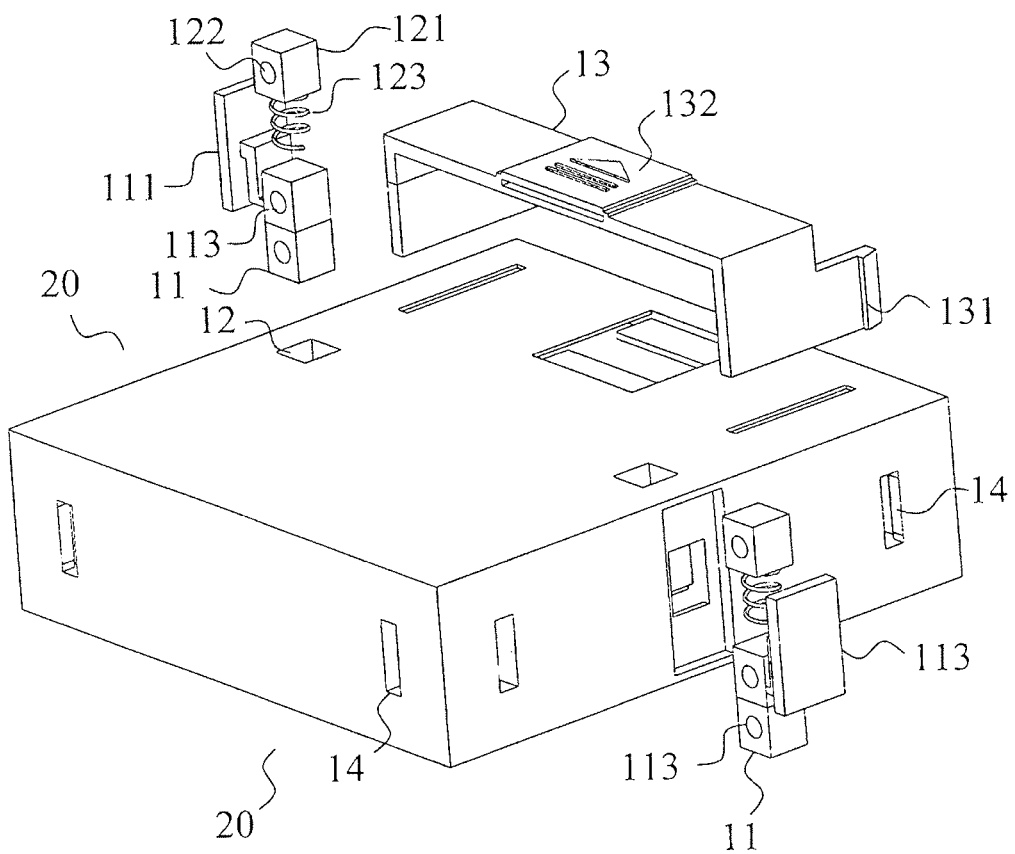
FIG. 5 is an exploded view of a battery module of a mobile power bank according to an embodiment.
Figure 6:
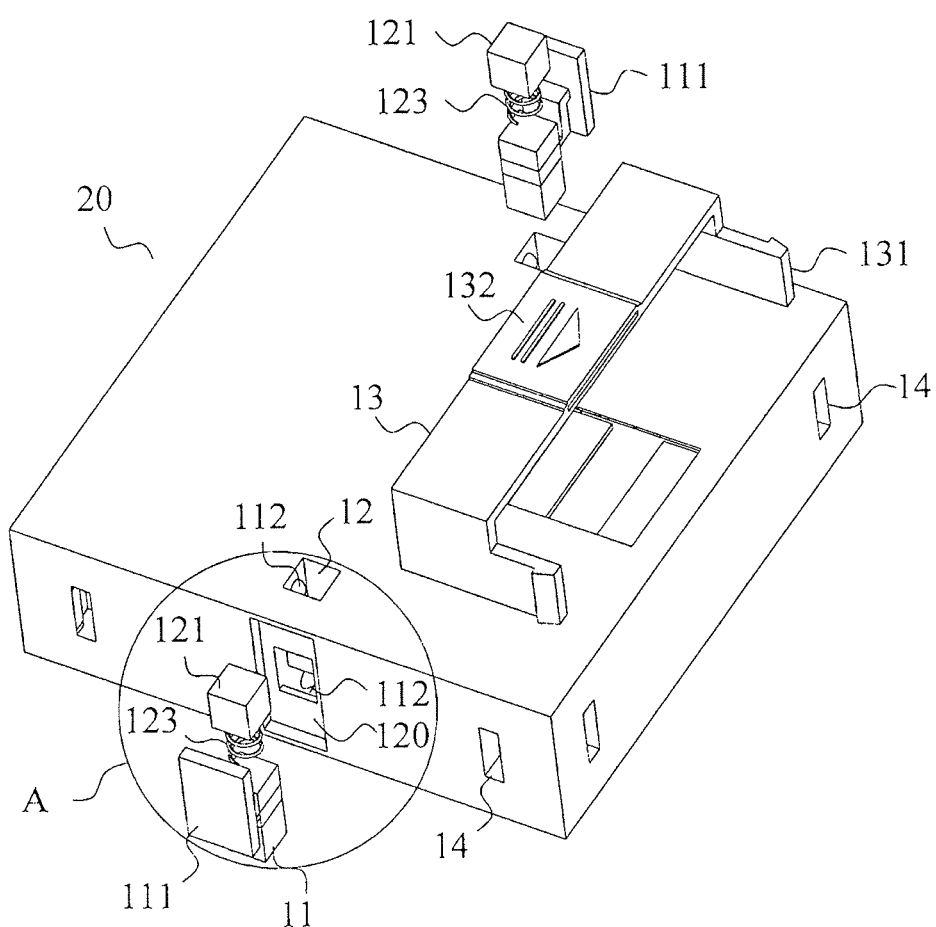
FIG. 6 is an exploded view of a battery module of a mobile power bank viewed from another angle according to an embodiment.
Figure 7:
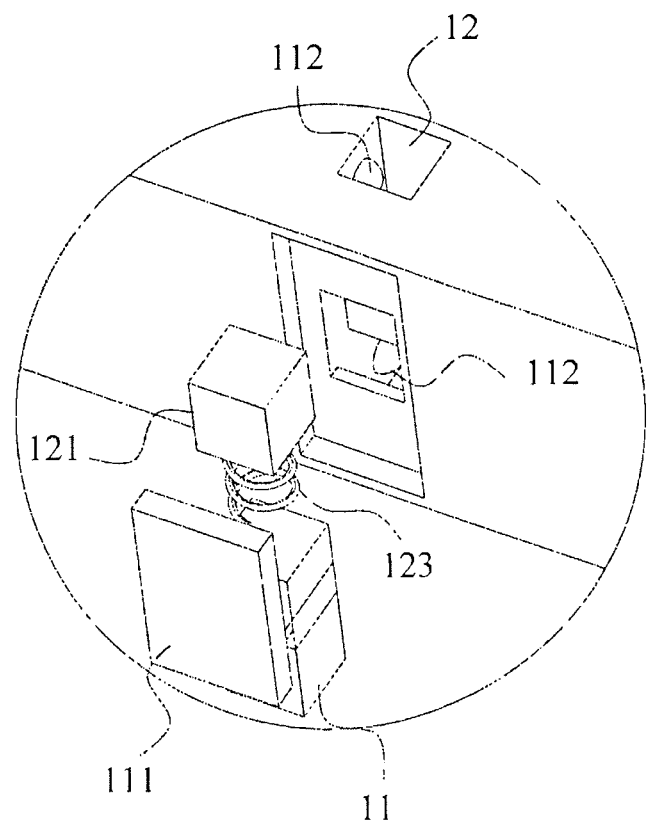
FIG. 7 is a partial enlarged diagram of A in FIG. 6.
Figure 8:
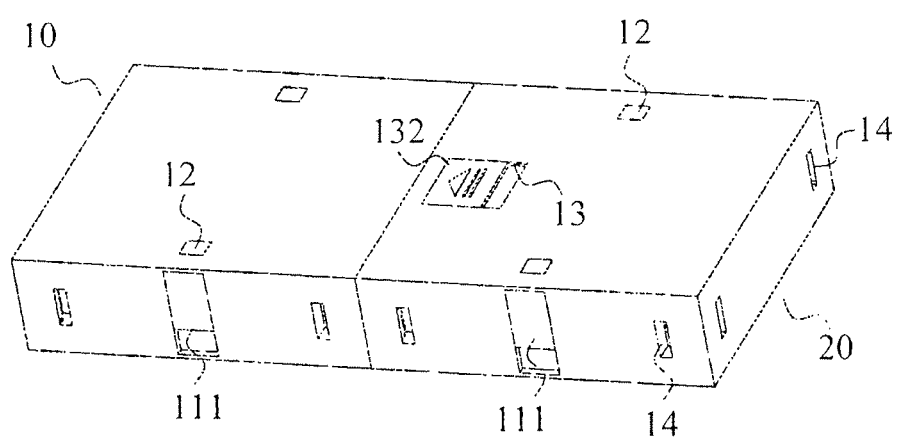
FIG. 8 is a schematic diagram of a connection between a battery module and a control module of a mobile power bank according to an embodiment.
Figure 9:
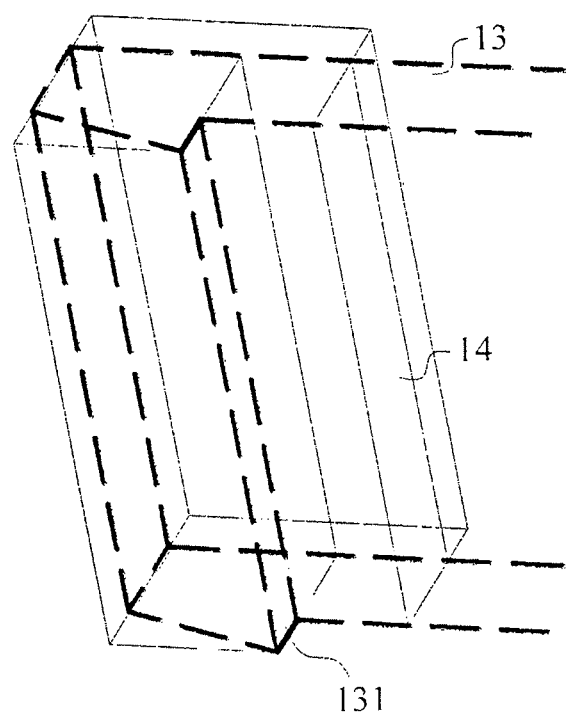
FIG. 9 is a schematic diagram of a connection between a second telescopic element and a second hole of a mobile power bank according to an embodiment.
Figure 10:
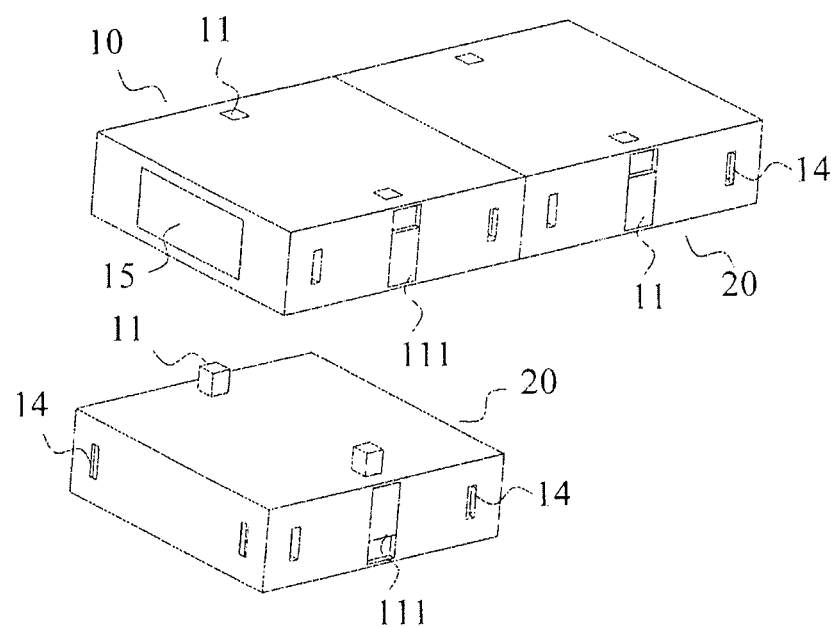
FIG. 10 is a schematic diagram of a connection between two battery modules and a control module of a mobile power bank according to an embodiment.
Figure 11:
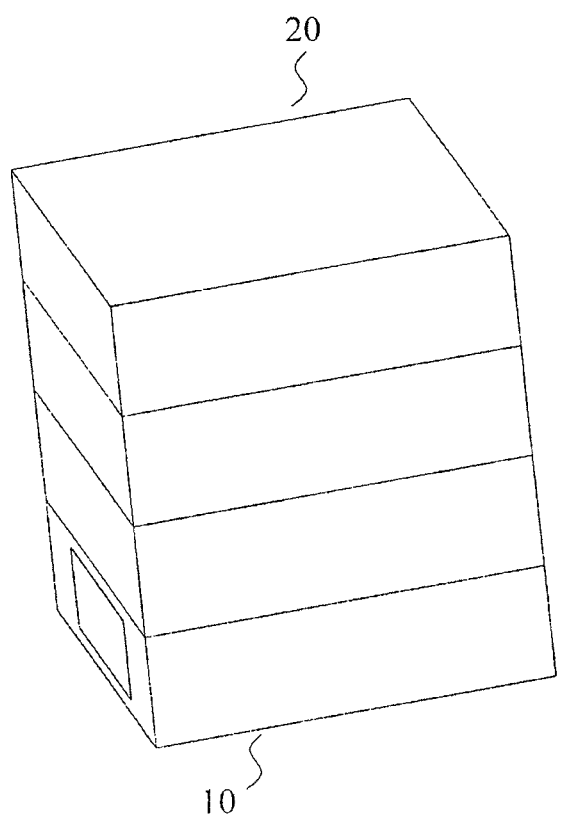
FIG. 11-13 are diagrams showing three combinations of a mobile power bank according to an embodiment.
Figure 12:
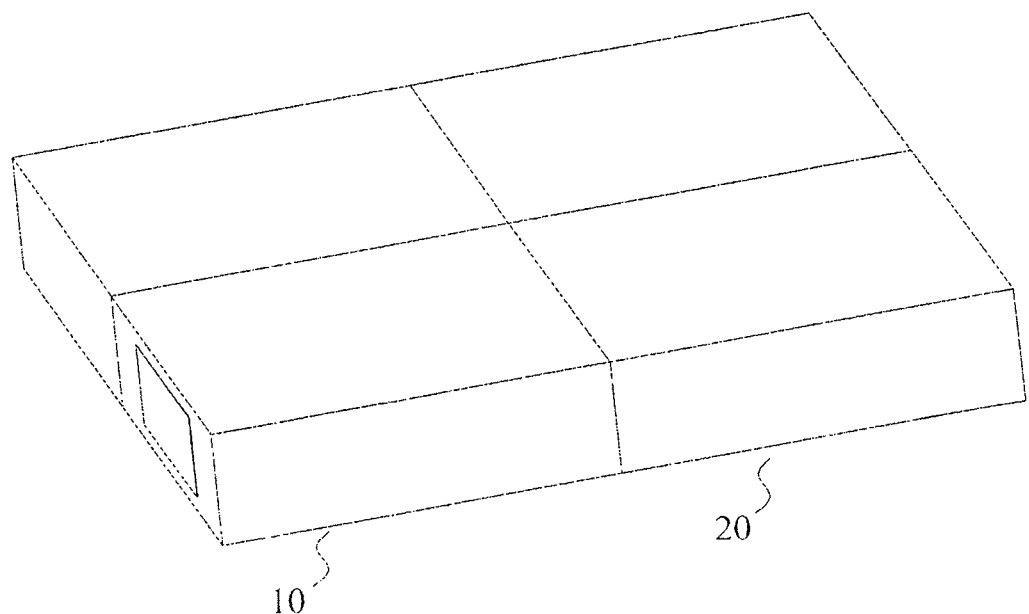
Figure 13:
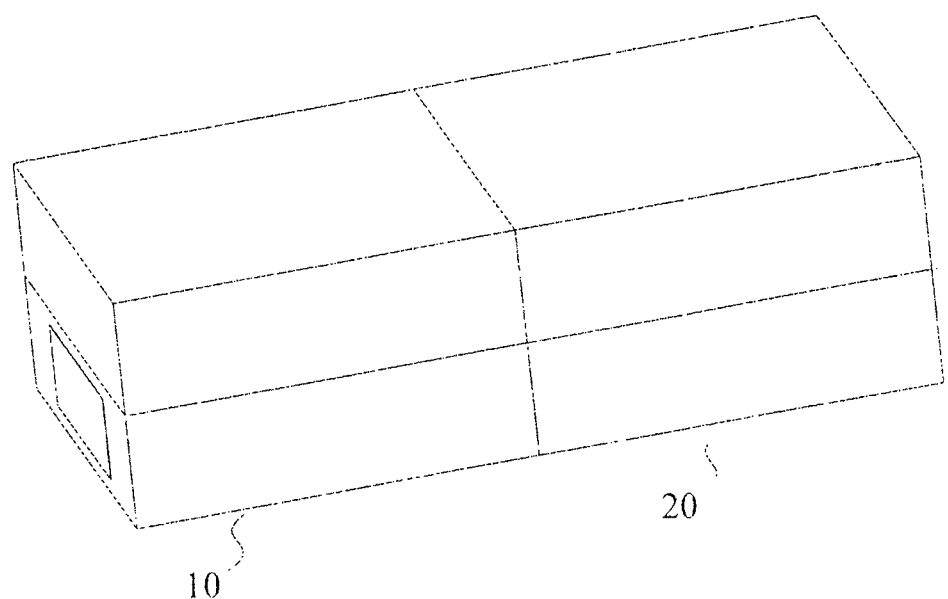

As shown in FIG. 1 to FIG. 13, FIG. 1 is an assembly diagram of a mobile power bank according to an embodiment; FIG. 2 is an overall structure diagram of a battery module of a mobile power bank according to an embodiment; FIG. 3 is an overall structural diagram of a battery module of a mobile power bank viewed from another angle according to an embodiment; FIG. 4 is a diagram showing an internal structure of a battery module of a mobile power bank according to an embodiment; FIG. 5 is an exploded view of a battery module of a mobile power bank according to an embodiment; FIG. 6 is an exploded view of a battery module of a mobile power bank viewed from another angle according to an embodiment; FIG. 7 is a partial enlarged view of A in FIG. 6; FIG. 8 is a schematic diagram of a connection between a battery module and a control module of a mobile power bank according to an embodiment; FIG. 9 is a schematic diagram of a connection between a second telescopic element and a second hole of a mobile power bank according to an embodiment; FIG. 10 is a schematic diagram of a connection between two battery modules and a control module of a mobile power bank according to an embodiment; and FIG. 11-13 are diagrams showing three combinations of a mobile power bank according to an embodiment. As shown in the drawings, the mobile power bank includes at least two cuboid modules with the same shape, and the cuboid module includes a control module 10 and at least one battery module 20. The six surfaces of each cuboid module include two base surfaces and four side surfaces, and the shape of the base surface is square.

The two base surfaces of the battery module 20 are respectively provided with a first telescopic element 11 and a first hole 12 corresponding to the first telescopic element 11. One of the four sides of the control module 20 is provided with a second telescopic element 13, and the other three are each provided with a second hole 14 corresponding to the second telescopic element 13.

The two base surfaces of the control module 10 are respectively provided with a first telescopic element 11 and a first hole 12 corresponding to the first telescopic element 11. One of the four sides of the control module 20 is provided with a power function element 15, and the other three are each provided with a second hole 14 corresponding to the second telescopic element 13.

The first telescopic element 11 is configured to be electrically connected to the first hole 12 in a pluggable manner. The second telescopic element 13 is configured to be electrically connected to the second hole 14 in a pluggable manner.

The control module 10 is configured to manage charging and discharging of the battery module 20 connected to the control module 10.

In the related art, the mobile power bank generally includes a data cable and a main body. The data cable and the main body are detachable from each other. However, the main body as a whole integrates the battery and all the functions of charging and discharging. The main body can only be carried or replaced as a whole. In this solution, the mobile power bank is modularly designed, and a plurality of modules are connected by mechanical structures. A plurality of cuboid modules are provided with telescopic elements and holes, the telescopic element can move in a direction perpendicular to the mounting surface, and extend out of or retract to the cuboid module according to the connection needs. When the cuboid modules need to be connected, the telescopic element extends from the cuboid module and is inserted into the corresponding hole. In FIG. 2, the first telescopic element 11 is in the state of extending from the cuboid module. In FIG. 3, the second telescopic element 13 is in the state of extending from the cuboid module. When the cuboid module need to be separated, the telescopic element is pulled out of the hole, and the telescopic element is pressed to retract to the cuboid module. When being inserted into the hole, the contacting surface of the telescopic element is provided with a copper sheet, and the copper sheet is connected to the electrical function component of the corresponding cuboid module. After the telescopic element is inserted into the hole, the copper sheet contacts the electrical functional component to realize the electrical connection between the cuboid modules, and finally the plurality of cuboid modules are assembled as a whole structurally and functionally.

A pair of opposite sides of the cuboid module is set to be in a square shape (defined as the base surfaces), which also means that the other four sides of the cuboid module have the same shape. The telescopic elements and the corresponding holes of the sides can be interconnected freely, which increase a degree of freedom of connection between the plurality of modules. In order to distinguish the telescopic elements and the holes, the telescopic element on the base surface is defined as the first telescopic element 11, and the hole on the base surface is defined as the first hole 12. The telescopic elements on the sides are respectively defined as the second telescopic elements 13, and the holes on the sides are defined as the second holes 14. In this solution, one of the four sides of the battery module 20 is provided with a second telescopic element 13, and the other three sides are each provided with a second hole 14. One of the four sides of the control module 10 is provided with a power function element 15, and the other three sides are each provided with a second hole 14. Based on this design, the control module 10 can be accessed by the battery module 20s via three sides where the power function element 15 is not located. That is, the three sides of the control module 10 where the second holes 14 are provided can be connected to other battery modules 20 freely. In addition to the first telescopic element 11 and the first hole 12 on the base surface, the plurality of cuboid modules may be combined in various combination modes and the combination number is large. It can provide the users with the appropriate mobile power bank capacity according to the actual demand of electronic device. Users carry the mobile power bank according to their own needs, and avoid carrying unnecessary weight when traveling, and do not need to prepare in advance a variety of different mobile power banks for a variety of different electronic devices.

As we all know, the service life of chemical battery such as lithium battery, lead battery and the like is not infinite. Due to the increase in the number of use or wrong usage habits, the charging and discharging ability of chemical battery may not meet the requirements for use after a certain period of use. In the related art, after the charging and discharging of the mobile power bank cannot be performed normally, the user generally replaces the entire mobile power bank. In this solution, the mobile power bank adopts a modular design. When the performance of a single module is reduced to the point that the module cannot be maintained and used, this module can be directly and separately replaced, and the modules that still operate normally are used as before. For the users, the cost of replacing the mobile power bank is significantly reduced, and the damage to the environment caused by the chemical pollutants in the mobile power bank is greatly reduced.

In this embodiment, in order to realize the interconnection of the cuboid modules, at least one spherical hole is arranged on a side of the first telescopic element 11, and at least one spherical elastic locking element 112 is arranged on an inner wall of the first hole 12.

When the first telescopic element 11 is inserted into the first hole 12, the spherical elastic locking element 112 is inserted into the spherical hole.

In one or more embodiments, the number of the spherical holes is multiple, an inner wall of an accommodating channel 120 where the first telescopic element 11 is located is provided with the spherical elastic locking element 112.

In one or more embodiments, when the first telescopic element 11 is located inside the cuboid module 120 and when the first telescopic element 11 is inserted into the first hole 12, the spherical elastic locking element 112 in the accommodating channel 120 is embedded in different spherical holes of the first telescopic element 11.

The cooperating relationship between the first telescopic element 11, the spherical hole, and the spherical elastic locking element 112 are described with reference to FIG. 4, FIG. 5, FIG. 6, and FIG. 7. The spherical hole is a half hole, and the entire inner wall of the half hole is a part of the spherical surface, of course, it may be a part of the surface of ellipsoid. In this embodiment, the spherical hole on a side of the first telescopic element 11 is defined as the first spherical hole 113. The engaging element corresponding to the spherical hole is the spherical elastic locking element 112. In one or more embodiments, the spherical diameter of the first spherical hole is equal to or smaller than the spherical diameter of the spherical elastic locking element 112. The first spherical hole and the spherical elastic locking element 112 are fitted with each other. The spherical surface of the first spherical hole 113 is a concave surface, and the spherical surface of the spherical elastic locking element 112 is a convex surface. When the first telescopic element 11 is inserted into the first hole 12, the spherical elastic locking element 112 is embedded in the first spherical hole 113. Because of the engagement direction between the spherical elastic locking element 112 and the first spherical hole 113 is vertical to the telescopic direction of the first telescopic element 11, so that with the cooperation between the spherical elastic locking element 112 and the first spherical hole 113, the position of the first telescopic 11 can be easily fixed from the side.

In order to maintain the structure stability after the first telescopic element 11 is inserted into the first hole 12, the number of the first spherical holes 113 is multiple. As shown in FIG. 4, the number of the first spherical holes 113 is two. The two first spherical holes 113 may be distinguished by an upper position and a lower position based on the viewing angle of FIG. 4. In the FIG. 4, the first telescopic element 11 extends from the battery module 20, and the spherical elastic locking element 112 on the inner wall of the accommodating channel 120 (as shown in FIG. 6) is embedded in the second one of the two first spherical holes 113 in the lower part of the figure. When the battery module 20 in FIG. 4 is connected to the base surface of another battery module 20 or the base surface of the control module 10, the first telescopic element 11 in FIG. 4 is inserted into the first hole 12 on the base surface of the other battery module 20 or the first hole 12 on the base surface of the control module 10. The spherical elastic locking element 112 on the inner wall of first hole 12 is embedded in the lower first spherical hole 113. Finally, with the cooperation of the two first spherical holes 113 of the first telescopic element 11 and the spherical elastic locking elements 112 of the two different cuboid modules, the two cuboid modules are stably connected. When the battery module 20 in FIG. 4 is separated from other cuboid modules, pressing the first telescopic element 11 enables the entire first telescopic element 11 to be located in the accommodating channel and retracted into the battery module 20. At this time, the spherical elastic locking element 112 in the accommodating channel is embedded in the lower spherical hole, which maintains the state of the first telescopic element 11 in the accommodating channel. In general, only one spherical elastic locking element 112 is needed to maintain the first telescopic 11 in the accommodating channel when the first telescopic 11 is retracted into the cuboid module.

In one or more embodiments, the spherical elastic locking element 112 may be selected to be elastic colloid, and the spherical elastic element 112 made from the elastic colloid is integrally compressed when entering and exiting the first spherical hole 113.

In addition, the spherical elastic locking element 112 is further disposed in a first channel 41 perpendicular to the first hole 12 or a sidewall of the accommodating channel, and is connected to a first spring 411 inside the first channel 41. In this configuration, the position of the spherical elastic locking element 112 is changed by the expansion and contraction of the first spring 411. As shown in FIG. 4, the expansion and contraction of the spherical elastic locking element 112 is realized by the first spring 411.

For the connection between the sides of the cuboid modules, as shown in FIG. 4 and FIG. 5, an elastic wedge structure 131 is disposed on a side of the front end of the second telescopic element 13. The length of a first side of an opening of the second hole 12 at the side surface is smaller than the length of a first side of an end surface that is inside the second hole 12 and opposite to the opening. The opening and the first side are both rectangular. In one or more embodiments, the cavity has a step structure that is engageable with the wedge structure 131;

When the second telescopic element 13 is inserted into the second hole 14, the wedge structure 131 is pressed into the second hole 14.

The wedge structure 131 is equivalent to a larger structure formed at the front end of the second telescopic element 13, and the size of the opening of the second hole 14 formed on the side surface is smaller than that the size of the part of the second hole 14 away from the side surface, that is, the second hole 14 is of a structure with a large inner portion and a small outer portion. When the second telescopic element 13 is inserted into the second hole 14, the wedge structure 131 is pressed into the second hole 14, the larger portion of the second telescopic element 13 and the larger portion of the second hole 14 are engaged. When the side surfaces are connected as shown in FIG. 8, a stable connection is finally formed by the engaging structure shown in FIG. 9. In FIG. 9, the fine solid line shows the second hole 14, and the thick dotted line shows the second telescopic element 13.

As shown in FIG. 2 and FIG. 3, a first driving element 111, configured to push the first telescopic element 11, is connected to the first telescopic element 11, the operating surface of the first driving element 111 can be disposed on the side. A second driving element 132, configured to push the second telescopic element 13, is connected to the second telescopic element 13, and the operating surface of the second driving element 132 can be disposed on the bottom surface.

The first telescopic element 11 can only move perpendicular to the base surface, so the operating surface of the first driving element 111 connected to the first telescopic element 11 is disposed on the side. As shown in FIG. 2, when the user needs to connect the battery module 20 with other cuboid modules, the user contacts the first the driving element 111 through the side surface, and applies a force perpendicular to the base surface to the operating surface to make the first driving element 111 move perpendicular to the base surface (bottom surface in FIG. 2), such that the first telescopic element 11 is driven to extend from the base surface. When the first telescopic element 11 needs to be retracted back, do the reverse movement. The second telescopic element 13 and the second driving element 132 operate in the same manner and not separately description herein. In addition, at least one of the operating surface of the first driving element 111 and the operating surface of the second driving element 132 is provided with a resistance increased pattern 1111. As shown in FIG. 2 and FIG. 3, only the operating surface of the second driving element 132 is provided with resistance increased pattern 1111. The resistance increased pattern 1111 increases the friction when the user touches the operating surface, and the expansion and contraction of the first telescopic element 11 and/or the second telescopic element 13 are more convenient.

As shown in FIG. 4, FIG. 6 and FIG. 7, a filling element 121 is disposed in the first hole 12, a spherical hole corresponding to the spherical elastic locking element 112 is disposed on the side of the filling element 121.

The inner end of the filling element 121 is connected to the first end of the second spring 123, and the second end of the second spring 123 is fixed on the housing of the cuboid module. In one or more embodiments, the second end of the second spring 123 is fixed on the first telescopic element 11.

When the first elastic element 11 is pulled out of the first hole 12, the spherical elastic locking element 112 is embedded in the spherical hole of the filling element 121. The outer end of the filling element 121 is flush with the base surface of the cuboid module.

Herein, the spherical hole on the filling element 121 is defined as the second spherical hole 122. The function of the filling element 121 is to maintain the integrity of the cuboid module structure. Under the connected state, the first hole 12 is filled with the first elastic element 11 and the first hole 12 cannot be seen from the outside at this time. However, for the outermost cuboid module, if the hole and other structures are provided on the outermost cuboid module during usage, it does not quite conform to the general industrial design habits of electronic products in terms of appearance. Herein, the hole and other structures are eliminated by the filling element 121, and the external structure of the mobile power bank is better in integrity. When the filling element 121 is filled in the first hole 12, the spherical elastic locking element 112 is embedded in the second spherical hole 122. When the first telescopic element 11 is inserted into the first hole 12, the first telescopic element 11 pushes the filling element 121 inwardly, the spherical elastic locking element 112 is compressed inwardly and slides out of the second spherical hole 122, and the filling element 121 pushes the second spring 123 inward until the spherical elastic locking element 112 is embedded in the first spherical hole 113 on the first telescopic element 11. When the first telescopic element 11 is pulled out from the first hole 12, the compressed second spring 123 pushes the filling element 121 to return, and the spherical elastic locking element 112 is embedded in the second spherical hole 122 on the filling element 121.

In addition, it should be emphasized that the implementations of the first telescopic element 11 and the first hole 12 defined in the foregoing are different from the implementation manners of the second telescopic element 13 and the second catch hole 14, and are not limited to only one implementation manner. In the actual implementation process, the two groups of connections can all select the implementation of the first telescopic element 11 and the first hole 12 defined in the foregoing, and all select the second telescopic element 13 and the second hole 14 defined in the foregoing. It can even implement them separately in another implementation In order to realize the overall management of the entire mobile power bank, the power function element 15 includes a display screen, a charging port, and a discharging port. Corresponding to these components of the power function 15, the control module 10 includes a control circuit, a charging circuit, and a discharging circuit. The charging port and the discharging port belong to the conventional structure of the mobile power bank, and are not described in detail here. The display screen is mainly used to display the working state of the mobile power bank and may include the working states of the plurality of battery modules 20, such as the remaining power.

It should be noted that, in order to realize the independence of the performances of the plurality of battery modules 20 as much as possible, the battery modules 20 are each provided with the charging port. After the multiple battery modules 20 are separated from the mobile power bank, independent charging can be realized, and the application of the battery module 20 can be more flexible.

Based on the technical solutions described above, the mobile power bank in this solution may have multiple combination manners. In this solution, any two cuboid modules have two types of combination manners, one is the side connection shown in FIG. 8, and the other is the base surface connection of two cuboid modules shown in the left part of FIG. 10, and finally the mechanical structure and electrical functions of the entire mobile power bank are realized by connecting multiple cuboid modules. Taking four cuboid modules as an example, the four cuboid modules may be connected by all base-surface-to-base-surface connection as shown in FIG. 11, the four cuboid modules may be connected by all side-surface-to-side-surface connection as shown in FIG. 12, and the four cuboid modules may be connected by a hybrid of base-surface-to-base-surface connection and side-surface-to-side-surface connection as shown in FIG. 13. In addition, the all side-surface-to-side-surface connection can be realized by connecting the side surfaces of the four cuboid modules in sequence. The hybrid of base-surface-to-base-surface connection and side-surface-to-side-surface connection be realized by connecting the two cuboid modules on the right of FIG. 13 to other two directions of the two cuboid modules on the left of the FIG. 13. One control module 10 and three battery modules are required to implement the mobile power bank function for the four cuboid modules connection described above, but the basis of the realization of this combination is that the control module 10 is only used for managing the charging and discharging of mobile power bank. If the control module 10 is further provided with a battery pack, the control module 10 has the function of the battery module 20, and the four cuboid modules may have multiple control modules 10 in this case. Two points should be noted for the case of multiple control modules 10. One point is that if the charging and discharging management of only one control module 10 is retained, the entire mobile power bank is managed by the only one control module 10. The other point is that if the control module 10 has only one type of connector, there is only one connection manner for connecting the control modules 10, for example, all of the four cuboid modules are control modules 10, and the four control modules can only be connected in the connection manner shown in FIG. 11.

In addition to the connections described above, the capacity of the mobile power bank in this solution adapts to various electronic devices, and the charging and discharging interfaces also adapt to various electronic devices. The output interfaces includes alternating current (AC) (compatible with AC 120V output and AC 220V output), direct current (DC), Mirco Universal Serial Bus (USB), USB, USB Type-A, and USB Type-C and the like. The input interface accepts a voltage range of 4.5V-80V, and the mobile power bank can be charged by most of chargers around us, such as a solar panel, a charging post for car or a computer adapter and the like. The mobile power bank can also receive various forms of energy, for example, clean energy such as solar energy, wind energy, and electrical energy and the like. The charging management module of the mobile power bank intelligently acquires the maximum power of the charger such that the mobile power bank is charged with minimal charging time. The control module is also equipped with a wireless charging module, which supports all electronic products with wireless charging protocols on the market.

Based on the connections described above, the supportable electronic devices and the power supplies are adapted, so as to have an external interface compatible with the freely combined mobile power bank.

INDUSTRIAL APPLICABILITY

The present disclosure sets the volume of the mobile power bank on demand, and the battery module is replaced individually, thereby reducing the cost of replacing the mobile power bank while being more environmentally friendly.

What is claimed is:

1. A mobile power bank, comprising at least two cuboid modules, wherein the at least two cuboid modules have the same shape and comprise a control module and at least one battery module;
   a first side and a second side of each of the at least two cuboid modules are oppositely disposed and shapes of the first side and the second side are square;
   each of the at least one battery module comprises: a first telescopic element disposed on the first side, a first hole disposed on the second side and corresponding to the first telescopic element, a third side, a fourth side, a fifth side and a sixth side, and a second telescopic element disposed on the sixth side, wherein the third side, the fourth side and the fifth side are each provided with a second hole corresponding to the second telescopic element;
   the control module comprises a first telescopic element disposed on the first side, a first hole corresponding to the first telescopic element and disposed on the second side, a third side, a fourth side, a fifth side and a sixth side, and a power function element disposed on the sixth side, wherein the third side, the fourth side and the fifth side are each provided with a second hole corresponding to the second telescopic element, the first telescopic element is configured to be electrically connected to the first hole in a pluggable manner, and the second telescopic element is configured to be electrically connected to the second hole in a pluggable manner; and the control module is configured to manage charging and discharging of the battery module connected to the control module.

2. The mobile power bank according to claim 1, wherein at least one spherical hole is disposed on a side of the first telescopic element, and at least one spherical elastic locking element is disposed on an inner sidewall of the first hole; and when the first telescopic element is inserted into the first hole, the at least one spherical elastic locking element is embedded in the at least one spherical hole.

3. The mobile power bank according to claim 2, wherein there are a plurality of spherical holes; and a spherical elastic locking element is disposed on an inner sidewall of an accommodating channel where the first telescopic element is located; and when the first telescopic element is located inside the cuboid module and when the first telescopic element is inserted into the first hole, the same spherical elastic locking element in the accommodating channel is embedded in different spherical holes of the first telescopic element.

4. The mobile power bank according to claim 3, wherein the spherical elastic locking element is elastic colloid.

5. The mobile power bank according to claim 3, wherein the spherical elastic locking element is further disposed in a first channel perpendicular to the sidewall of the accommodating channel or the first hole, and is connected to a first spring inside the first channel.

6. The mobile power bank according to claim 1, wherein an elastic wedge structure is disposed on a side of a first end of the second telescopic element, and a length of a first side of an opening of the second hole is smaller than a length of a first side of an end surface that is inside the second hole and opposite to the opening;

when the second telescopic element is inserted into the second hole, the wedge structure is pushed into the second hole.

7. The mobile power bank according to claim 1, further comprising:

a first driving element, which is connected to the first telescopic element and configured to push the first telescopic element, wherein an operating surface of the first driving element is disposed on the side; and a second driving element, which is connected to the second telescopic element and configured to push the second telescopic element, wherein an operating surface of the second driving element is disposed on the first side or the second side.

8. The mobile power bank according to claim 6, wherein at least one of the operating surface of the first driving element and the operating surface of the second driving element is provided with a resistance increased pattern.

9. The mobile power bank according to claim 2, wherein a filling element is disposed in the first hole, a side of the filling element is provided with a spherical hole corresponding to the spherical elastic locking element;

an inner end of the filling element is connected to a first end of a second spring, and a second end of the second spring is fixed on a housing of the cuboid module; and when the first telescopic element is pulled out from the first hole, the spherical elastic locking element is embedded in the spherical hole of the filling element, and an outer end of the filling element is flush with the first side or the second side of the cuboid module.

10. The mobile power bank according to claim 1, wherein the power function element comprises a display screen, a charging port and a discharge port; and a battery pack is disposed in the control module.

11. The mobile power bank according to claim 1, wherein the battery module comprises a charging port.

* * * * *